United States Patent
Dvořák

(10) Patent No.: US 10,341,316 B2
(45) Date of Patent: Jul. 2, 2019

(54) INJECTING CREDENTIALS INTO WEB BROWSER REQUESTS

(71) Applicant: Avast Software s.r.o., Prague (CZ)

(72) Inventor: Petr Dvořák, Srnojedy (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 285 days.

(21) Appl. No.: 15/186,177

(22) Filed: Jun. 17, 2016

(65) Prior Publication Data

US 2016/0373420 A1    Dec. 22, 2016

Related U.S. Application Data

(60) Provisional application No. 62/181,699, filed on Jun. 18, 2015.

(51) Int. Cl.
*H04L 29/06* (2006.01)
*G06F 21/45* (2013.01)

(52) U.S. Cl.
CPC ............ *H04L 63/062* (2013.01); *G06F 21/45* (2013.01); *H04L 63/083* (2013.01); *H04L 63/168* (2013.01)

(58) Field of Classification Search
CPC ... H04L 63/083; H04L 63/168; H04L 63/062; G06F 21/45
See application file for complete search history.

(56) References Cited

U.S. PATENT DOCUMENTS

| | | | | |
|---|---|---|---|---|
| 9,106,634 B2* | 8/2015 | Mendelovich | ........... | G06F 21/33 |
| 9,124,573 B2* | 9/2015 | Chastain | ............. | H04L 63/0807 |
| 10,146,931 B1* | 12/2018 | Kronrod | ................. | G06F 21/45 |
| 2006/0005234 A1* | 1/2006 | Birk | ........................ | H04L 29/06 |
| | | | | 726/9 |
| 2009/0007243 A1* | 1/2009 | Boodaei | ................ | H04L 9/3226 |
| | | | | 726/5 |
| 2009/0208020 A1* | 8/2009 | Grynberg | ................ | G06F 21/31 |
| | | | | 380/277 |
| 2010/0199086 A1* | 8/2010 | Kuang | ................ | H04L 63/0869 |
| | | | | 713/155 |
| 2012/0278879 A1* | 11/2012 | Ganem | ................... | G06F 21/34 |
| | | | | 726/16 |
| 2014/0173708 A1* | 6/2014 | Garlick | ................... | H04L 63/08 |
| | | | | 726/7 |

(Continued)

OTHER PUBLICATIONS

Silver et al., Password Managers: Attacks and Defenses, 16 Pages, http://crypto.stanford.edu/~dabo/pubs/papers/pwdmgrBrowser.pdf, Accessed Sep. 14, 2016.

(Continued)

*Primary Examiner* — Hee K Song
(74) *Attorney, Agent, or Firm* — Husch Blackwell LLP

(57) ABSTRACT

A password manager injects credentials into a web browser request. A user can browse to a form provided by a server that includes a password field. A plug-in requests a password for the field from a password manager. The actual password is not provided to the plug-in or the browser. The password manager provides a proxy password that is not the actual password for the field. A request interceptor in a separate process from the browser intercepts the completed request as it is sent to the server and replaces the proxy password with the actual password.

11 Claims, 5 Drawing Sheets

(56) References Cited

U.S. PATENT DOCUMENTS

| | | | |
|---|---|---|---|
| 2014/0189782 A1* | 7/2014 | Mendelovich | G06F 21/33 726/1 |
| 2014/0230013 A1* | 8/2014 | Gasparini | H04L 9/3213 726/1 |
| 2014/0282978 A1* | 9/2014 | Lerner | H04L 63/083 726/7 |
| 2015/0134956 A1* | 5/2015 | Stachura | H04L 63/0807 713/168 |
| 2015/0326559 A1* | 11/2015 | Kuang | H04L 63/083 726/5 |
| 2016/0205089 A1* | 7/2016 | Ott | H04L 9/32 726/7 |

OTHER PUBLICATIONS

Li et al., The Emperor's New Password Manager: Security Analysis of Web-based Password Managers, 23rd USENIX Security Symposium, Aug. 20-22, 2014, pp. 465-479, USENIX Association, San Diego, CA, USA.

* cited by examiner

INJECTING CREDENTIALS INTO WEB BROWSER REQUESTS

CROSS-REFERENCE TO RELATED APPLICATIONS

This Application claims priority to U.S. Provisional Patent Application Ser. No. 62/181,699, filed on Jun. 18, 2015, to Petr Dvorák, entitled "Injecting Credentials into Web Browser Requests," the entire disclosure of which is incorporated herein by reference.

FIELD OF THE INVENTION

The disclosure relates generally to web browsers, and more particularly, to injecting credentials into web browser requests.

BACKGROUND OF THE INVENTION

Many web applications and popular on-line services today use a combination of username and password for authentication. The use of passwords as an authentication mechanism has produced many challenges. One such challenge is that an end user may be required to remember many passwords for the different applications and on-line services used by the end user. Users are generally unable to perform this task properly. For example, the end users commonly choose one master password for all their web applications and services. Alternatively, the end user may write down the passwords, or they simply forget-and-renew them.

A separate category of applications referred to as password managers has emerged to solve this problem. Currently, password managers are typically browser plugins that are able to fill in the credentials directly into web HTML forms, in order to simplify and improve the user experience. This approach, on the other hand, can still make the passwords vulnerable to malicious JavaScript or malicious browser plugins or extensions (generally, to malicious software running in the scope of the web browser). These malicious pieces of software are able to read the password as soon as it is filled in the form and thus compromise the user's account.

SUMMARY OF THE INVENTION

Systems and methods employ a password manager that injects credentials into a web browser request. In particular, systems and methods include making a determination that a form includes a password field for a server application. A password for the server application is requested by a browser plugin from a password manager application, known as a password manager. In response to the request, data is received from the password manager. The data received from the password manager is not the actual password for the server application.

A password proxy is created from the data. The password proxy may be created by creating a derivative of the data received from the password manager. The password proxy may be created by applying a transformation to the data received from the password manager. The password proxy may be created by creating a randomly generated string of text. The password proxy may be created by creating an encrypted version of the actual password. The password proxy may be generated in the native password manager application. Alternatively, the password proxy may be generated in the browser plugin in a manner that enables the password manager application to look up the password. For example, in the case in which the password proxy is generated in the browser plugin, the public key in the browser plugin could be used to encrypt the login information with a login verifier and a private key in the password manager application could be used to decrypt the data and use it for looking up the actual password.

The password manager maintains a reference to the data. The maintained reference to the data associates the data with the actual password for the server application. In embodiments, the reference to the data is maintained for a limited amount of time. In embodiments, the data and the password are deleted after the data has been used once by the password manager to provide the password to the server application. In embodiments, the data and the password are deleted in response to a determination that a tab or window of a browser has closed.

The password field is filled with the created password proxy. A request interceptor intercepts a login request, containing the password proxy, which is intended for the server application. In particular, the request interceptor intercepts a login request containing the password proxy, issued by a browser, where the intended address of the login request is a server hosting the server application. The request interceptor determines the actual password for the server application based on the password proxy, such as by reversing a prior transformation to a data string that was supplied by the password manager to the browser plugin and then retrieving the actual password that is stored in association with that data string. The password proxy is replaced by the actual password and the request interceptor forwards the login request with the actual password to the server application.

DESCRIPTION OF THE SEVERAL VIEWS OF THE DRAWING

For a better understanding of the inventive subject matter, reference may be made to the accompanying drawings in which.

DETAILED DESCRIPTION OF THE INVENTION

Figure 1:
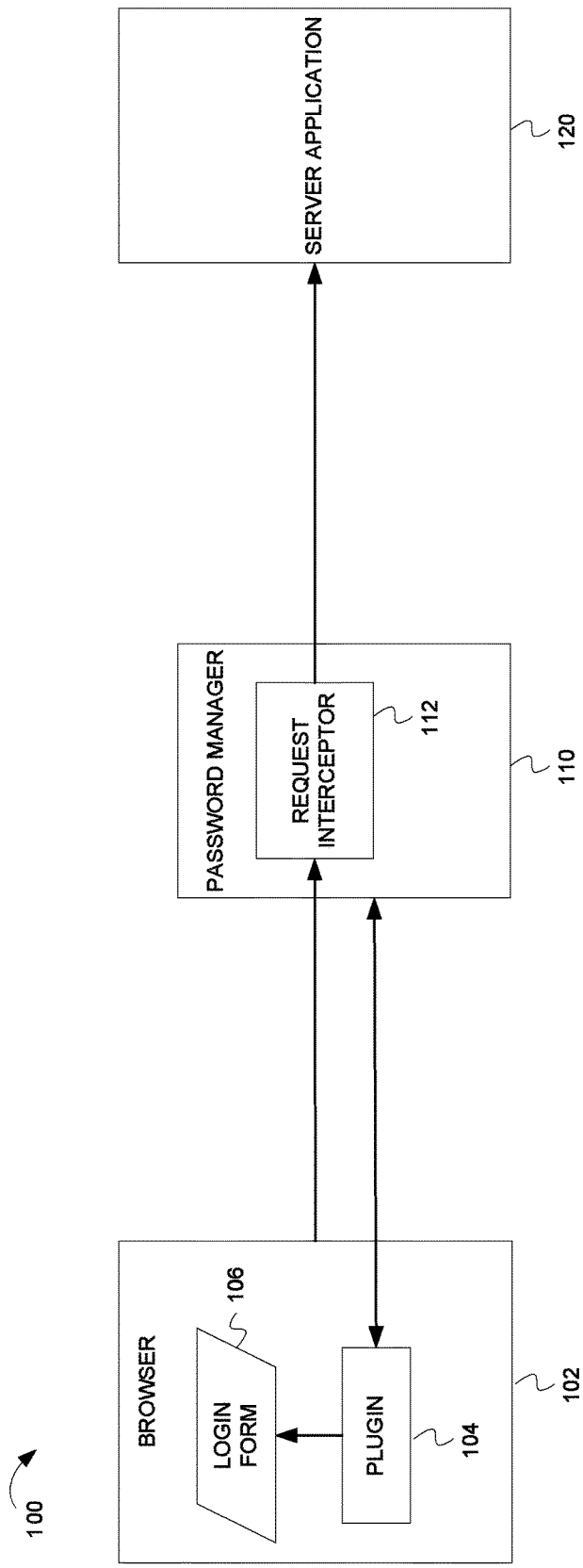
FIG. 1 is a block diagram of an operating environment for a system that injects credentials into a web browser request issued to a server application.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram of an operating environment for a system 100 that injects credentials into a web browser request issued to a server application. In some embodiments, system 100 includes a browser 102, a password manager 110, and a server application 120.

Browser 102 can be any type of web browser application such as MICROSOFT® INTERNET EXPLORER®, GOOGLE® CHROME®, MOZILLA® FIREFOX®, APPLE® SAFARI® etc. Browser 102 includes a browser plugin 104. Plugin 104 is loadable by browser 102 and becomes a part of browser 102. Plugin 104 typically extends the functionality of browser 102. A plugin may also be referred to as an extension. In some embodiments, plugin 104 is a password manager plugin that interacts with password manager 110 to simplify and improve password entry for server applications that require a password. The plugin 104 can read and manipulate HTML (Hypertext Markup Language) or DOM (Document Object Model) of a form loaded in the browser 102. For example, the server application 120 may provide a login form 106 that includes a password field. The plugin 104 can recognize the login form 106, and request a particular password associated with a user from password manager 110. The use of a password manager 110 and plugin 104 provides a means for a user to securely maintain various passwords for various software applications without having to remember each individual password for each of the various software application.

Password manager 110 is an application that is executed outside of and separate from the browser application. Password manager 110 maintains a database of login credentials (e.g., usernames and passwords) for a user. The database of passwords can include different sets of credentials associated with different applications and web pages utilized by an end-user. The password manager 110 can securely store the credentials, match the credentials to websites or applications, and can typically synchronize, share or export the credentials. Password manager 110 can encrypt the credential data so that the credential data is not in a clear text form as is typically the case when user's write down their user names and passwords.

Password manager 110 can include a request interceptor 112. Request interceptor 112 intercepts requests directed from browser 102 to server application 120 that contain password information for the server application 120 to use to authenticate the user of the browser 102.

In aspects where a request comprises an HTTPS request, password manager 110 can be configured as a root certificate authority so that the request interceptor 112 of the password manager 110 can intercept HTTPS requests. Other types of requests can be intercepted in alternative aspects of the disclosure. In such aspects, the request can be intercepted using a mechanism appropriate to the protocol used to issue the request. In general, any mechanism that redirects requests containing passwords outside of browser 102 can be used. Although shown as part of password manager 112, in some embodiments, request interceptor 112 can be a separate process.

Server application 120 can be any application that provides a login form 106 to a browser 102 for use in authenticating an end user or computing device used by an end user. In some embodiments, server application 120 is a web application that uses form-based authentication. Examples of such applications include financial applications (e.g., banking, stock trading, retirement account management, credit card account management etc.), social networking applications (e.g., Facebook, Linkedin, Twitter, Instagram etc.), information subscription accounts (newspaper, magazines, etc.), medical or educational record accounts etc. The embodiments are not limited to any particular type of server application.

In some aspects, password manager 110 is configured as a "man-in-the-middle" application in order to intercept requests from browser 102 before the request is delivered to server application 120. When the browser 102 is about to make a connection to the server application 120, password manager 110 takes over the handshake and connects itself to the server 120. When the server 120 sends its certificates as part of the HTTPS handshake, the password manager may verify them against a Windows system certificate store, a storage commonly used by browsers such as browser 102. The password manager then impersonates the browser 102 with respect to server 120 and impersonates the server 120 with respect to browser 102. Password manager 110 can run with Administrator rights and/or elevated trust on the computer. For example, it can create and store certificates that the browser 102 correctly accepts and trusts with respect to the machine that the password manager 110 is running on. For every original certificate, the password manager can make a copy and sign it with a special root certificate, located in the Windows certificate store. This special certificate can be used to clearly distinguish that the password manager created the special certificate.

Figure 2:
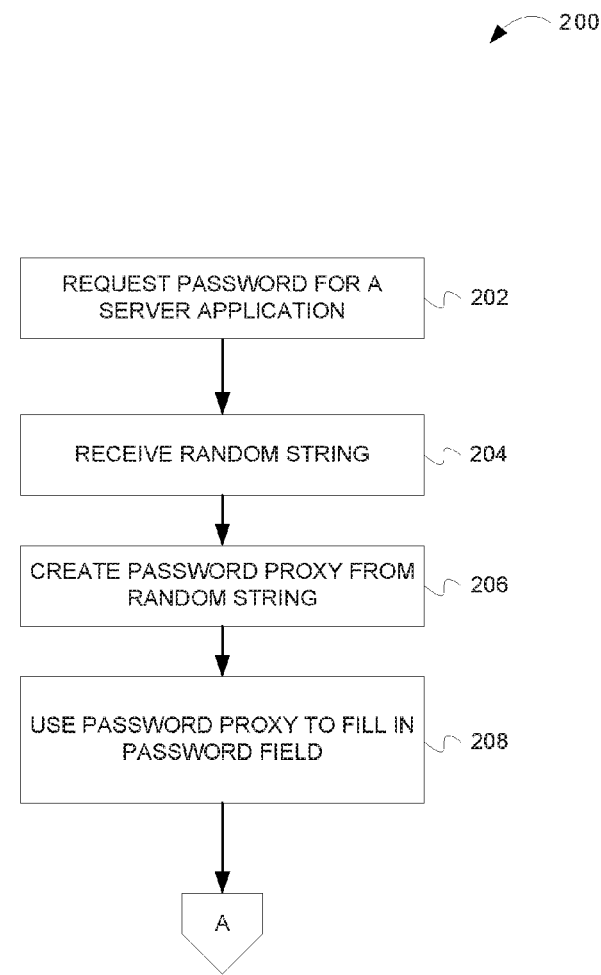
FIG. 2 is a flow chart illustrating operations of a method for a browser to request a password from a password manager and provide a password proxy to a browser form that contains a password field.
Figure 3:
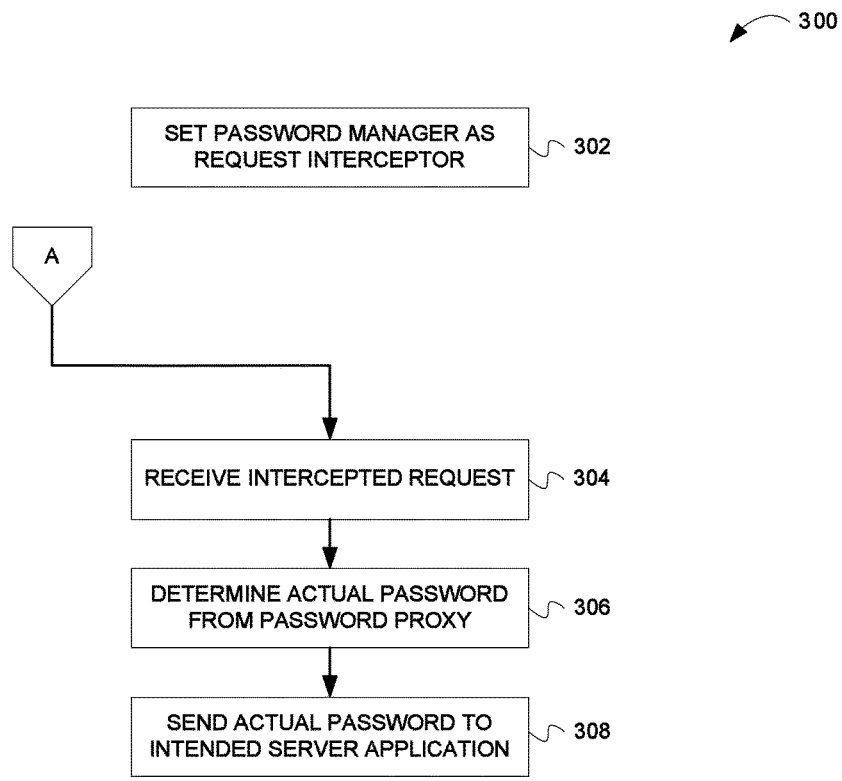
FIG. 3 is a flow chart illustrating operations of a method intercepting a request and injecting credentials to the request.
Figure 4:
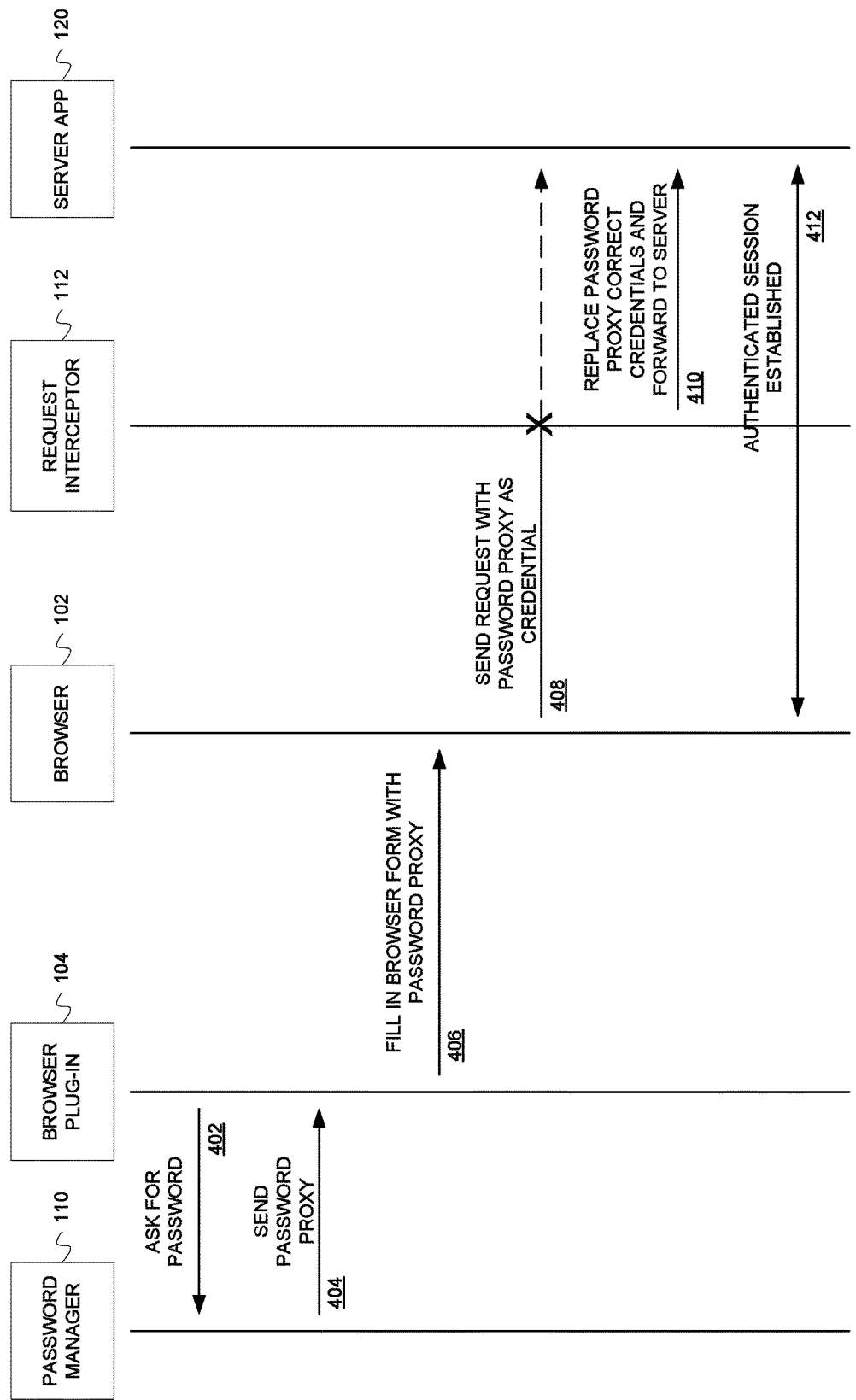
FIG. 4 is a sequence diagram illustrating operations for injecting credentials into a browser request.

Further details on the operation of system 100 will now be provided with reference to FIGS. 2-4.

FIG. 2 is a flow chart 200 illustrating operations of a method for a plugin to request a password from a password manager and provide a password proxy to a browser form that contains a password field. The method begins at block 202 by sending a request to a password manager to obtain a password. Typically the request will be sent in response to detecting that a form contains a password or PIN (Personal Identification Number) field. For example, a plugin 104 of a browser application may detect that a login form 106 sent from a server application 120 and displayed by the browser application 102 has a password or PIN field.

At block 204, a response is received from the password manager, where the response contains a data string for use in generating a proxy password. In some embodiments, the data string is a random string of characters that is generated by the password manager. The data string may not be the actual password for the server application 120. The password manager 110 maintains an internal reference to the data string for later use by the request interceptor 112. The internal reference associates the data string with the actual password for the server application. The reference to the data string may be kept by the password manager 110 for a limited amount of time. For example, in some aspects, the data string can treated as a "one time use" data string. In such aspects, the data string and password can be deleted after the data string has been used once by the password manager to return provide the password to server application 120. In alternative aspects, the data string and password can be deleted in response to determining that a tab or window of browser 102 that uses the proxy password has been closed.

At block 206, a password proxy is created from the data string. In some embodiments, the password proxy is a derivative of the data string. In other words, a transformation is applied to the data string to create the password proxy. Like the data string, the password proxy is not the actual password for the server application 120. In some aspects, the password proxy can be a randomly generated string of text. In alternative aspects, the password proxy can be an encrypted version of the actual password. For example, the password proxy can be encrypted using Advanced Encryption Standard (AES) or other encryption technique now known or developed in the future. Further transformations can be made to the actual password in order to further obfuscate the actual password during communication between components such as plugin 104, browser 102, and request interceptor 112.

At block 208, the plugin 104 fills in a password field of a login form with the password proxy.

After the plugin 104 has supplied the password proxy to the login form, the browser 102 issues a login request containing the password proxy (and username). The intended address of the login request is that of the server hosting server application 120.

FIG. 2 has described operations performed by a plugin (e.g., a browser password manager plugin). The detailed description will continue with details on operations performed by a password manager and request interceptor that can intercept the login request issued by the browser.

FIG. 3 is a flow chart 400 illustrating operations of a method intercepting a request and injecting credentials into the request. The method begins at block 302 where a password manager initializes as a request interceptor. As noted above, in some embodiments, the password manager establishes itself as a root certificate authority such that HTTPS requests are sent to the password manager instead of the intended destination.

At block 304, the request interceptor receives a request intended for a server application. As discussed above with respect to FIG. 2, the request can include login credentials such as a user name and a password, where the password in the request is a password proxy that is not the actual password of user of the server application.

At block 306, the password manager determines the actual password based on the password proxy received by the request interceptor. The password manager reverses the transformation of the password proxy to obtain the original data string supplied by the password manager to the plugin at block 206 (FIG. 2). As noted above, the password manager maintains an association from the data string to the actual credential data including the actual password for the user of the server application. The password manager uses this association to retrieve the actual credentials. The request interceptor replaces the password proxy in the intercepted request with the actual password for the server application.

At block 308, the request interceptor sends the password to the intended server application.

FIGS. 3 and 4 have described operations performed by a plugin and a password manager respectively. A sequence of operations showing the coordination of the plugin, browser and password manager will now be described.

FIG. 4 is a sequence diagram 400 illustrating operations for injecting credentials into a browser request. At operation 402, in response to the display of a login form by browser 102, the plugin 104 requests a password for server application 120 from password manager 110. In particular, the plugin queries for a password associated with a given web page provided by server application 120.

At operation 404, the password manager determines that a password exists for the requested page. Rather than sending the actual password, the password manager 110. sends a data string to the plugin 104. In some embodiments, the data string is a set of randomly generated characters. In alternative embodiments, the data string can be an encrypted version of the actual password. The password manager maintains an association between the data string and the actual credentials.

At operation 406, the plugin 104 fills in credential information (at least a password or PIN) on the form with the password proxy.

At operation 408, the browser 102 sends the request (containing the password proxy) with the server application 120 as the intended destination.

At operation 410, the request interceptor 112 of password manager 110 intercepts the request. The request interceptor 112 applies a reverse transformation to the password proxy to obtain the data string. The request interceptor 112 then uses the data string association with the actual credential information to retrieve the actual credential information. The request interceptor replaces the proxy password in the credential information in the request with the actual password and forwards the request to the server application 120.

At operation 412, the server application 120 uses the actual credential information (including the actual password) in the forwarded request to establish an authenticated communication session with the browser 102.

As will be appreciated from the foregoing, some embodiments provide a password manager that is separate and independent from a web browser, where the actual password is not entered within the browser, but is supplied after the browser issues a login request. As a result, malicious JavaScript running on the web page or malicious browser plugins or extensions are unable to obtain the actual password for a server application.

Figure 5:
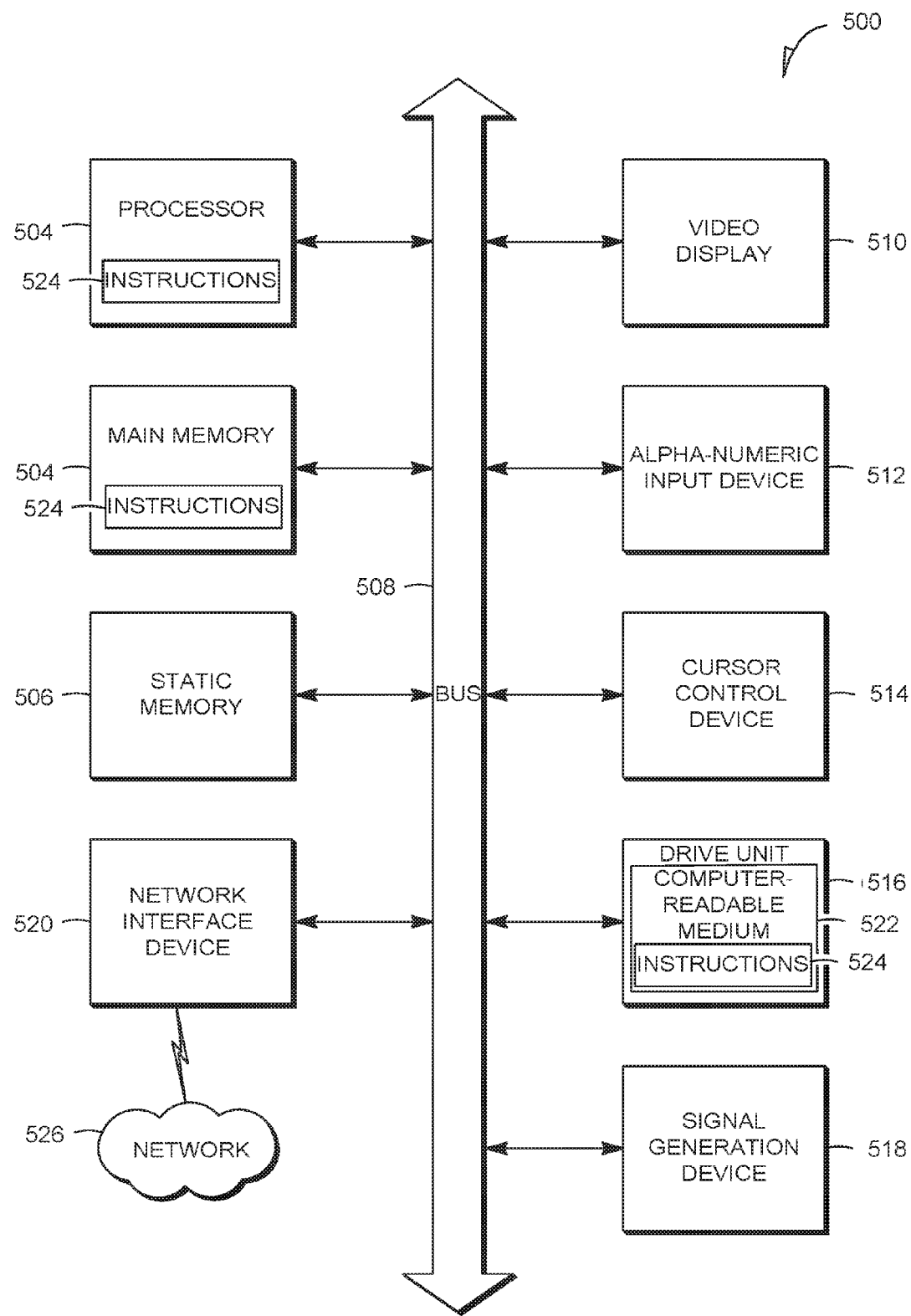
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
determining that a form includes a password field for a server application, wherein the form is displayed within a tab or a window of a browser executing on a device;
requesting a password for the server application from a password manager, wherein the password manager is executed on the device and includes a request interceptor;
receiving data from the password manager responsive to the request, wherein the data is not the actual password for the server application, and wherein the password manager maintains an internal reference associating the data with the actual password for the server application;
creating a password proxy from the data;
filling in the password field with the password proxy;
issuing, by the browser, a login request containing the password proxy, wherein an intended address of the login request is a server hosting the server application;
intercepting, by the request interceptor on the device, the login request containing the password proxy that is intended for the server application;
determining, by the request interceptor on the device, the actual password for the server application by reversing the password proxy to obtain the data from which the password proxy was created and obtaining the actual password from the internal reference associating the data with the actual password;
replacing, by the request interceptor on the device, the password proxy with the actual password in the login request;
forwarding, by the request interceptor on the device, the login request including the actual password to the server application; and
deleting the data received from the password manager and the password proxy in response to determining that the tab or the window of the browser within which the form is displayed has closed.

2. The method of claim 1, wherein said maintaining a reference to the data comprises maintaining the reference to the data for a limited amount of time.

3. The method of claim 2, said method further comprising deleting the data after the data has been used once by the password manager to provide the password to the server application.

4. The method of claim 1, wherein said creating a password proxy from the data comprises creating a derivative of the data to create the password proxy.

5. The method of claim 1, wherein said creating a password proxy from the data comprises applying a transformation to the data to create the password proxy.

6. The method of claim 1, wherein said creating a password proxy from the data comprises creating a randomly generated string of text.

7. The method of claim 1, wherein said creating a password proxy from the data comprises creating an encrypted version of the actual password.

8. The method of claim 1, said method further comprising initializing the request interceptor.

9. A method comprising:
initializing a request interceptor on a device, wherein the request interceptor comprises a password manager;
intercepting, by the request interceptor on the device, a login request intended for a server application, the login request including a password proxy, and the login request issued by a browser executing on the device;
determining, by the request interceptor on the device, an actual password for the server application by reversing the password proxy to obtain data from which the password proxy was created and obtaining the actual password from an internal reference associating the obtained data with the actual password;
replacing, by the request interceptor on the device, the password proxy with the actual password in the login request;
forwarding, by the request interceptor on the device, the login request including the actual password to the server application; and
deleting, by the request interceptor, the data and the password proxy in response to determining that a tab or a window of the browser that uses the password proxy has closed.

10. The method of claim 9, wherein the password manager establishes itself as a root certificate authority.

11. A method comprising:
displaying a browser, wherein the browser is executing on a device;
determining that a form includes a password field for a server application, wherein the form is displayed within a tab or a window of the browser;
requesting a password for the server application from a password manager, wherein the password manager is executed on the device, and wherein the password manager is separate and independent from the browser;
receiving data from the password manager responsive to the request, wherein the data is not the actual password for the server application, wherein the password manager maintains an internal reference associating the data with the actual password for the server application;
creating a password proxy from the data;
filling in the password field with the password proxy;
issuing, with the browser, a login request containing the password proxy, wherein an intended address of the login request is a server hosing the server application;
initializing a request interceptor on the device, wherein the request interceptor comprises the password manager;
intercepting, by the request interceptor on the device, the login request containing the password proxy that is intended for the server application;
determining, by the request interceptor on the device, the actual password for the server application by reversing the password proxy to obtain the data from which the password proxy was created and obtaining the actual password from the internal reference associating the data with the actual password;
replacing, by the request interceptor on the device, the password proxy with the actual password in the login request;

forwarding, by the request interceptor on the device, the login request including the actual password to the server application; and deleting the data received from the password manager and the password proxy responsive to determining that the tab or the window of the browser within which the form is displayed has closed.

\* \* \* \* \*